United States Patent

Miles

(10) Patent No.: US 11,048,747 B2
(45) Date of Patent: Jun. 29, 2021

(54) PREDICTING THE POPULARITY OF A SONG BASED ON HARMONIC SURPRISE

(71) Applicant: GEORGETOWN UNIVERSITY, Washington, DC (US)

(72) Inventor: Scott Miles, Virginia Beach, VA (US)

(73) Assignee: SECRET CHORD LABORATORIES, INC., Virginia Beach, VA (US)

( * ) Notice: Subject to any disclaimer, the term of this patent is extended or adjusted under 35 U.S.C. 154(b) by 6 days.

(21) Appl. No.: 16/786,816

(22) Filed: Feb. 10, 2020

(65) Prior Publication Data

US 2020/0265083 A1      Aug. 20, 2020

Related U.S. Application Data

(60) Provisional application No. 62/806,570, filed on Feb. 15, 2019.

(51) Int. Cl.
| | |
|---|---|
| G10H 1/06 | (2006.01) |
| G06F 16/65 | (2019.01) |
| G06F 16/61 | (2019.01) |
| G06F 16/683 | (2019.01) |

(52) U.S. Cl.
CPC ............... *G06F 16/65* (2019.01); *G06F 16/61* (2019.01); *G06F 16/683* (2019.01); *G10H 1/06* (2013.01)

(58) Field of Classification Search
CPC ...... G10H 1/0066; G10H 1/0025; G10H 1/06; G10H 2210/066; G10H 1/38; G10H 2240/056; G10H 2240/305; G10H 2240/131; G10H 2210/091; G10H 2240/081; G10H 2250/311; G10H 2210/341; G10H 2240/145; G10H 2240/141; G10H 2240/311; G10H 2210/031; G10H 2240/075; G10H 2210/571; G10H 2250/015; G10H 2250/641; G10H 2210/101; G10H 2240/135; G06F 16/65
See application file for complete search history.

(56) References Cited

U.S. PATENT DOCUMENTS

| | | | |
|---|---|---|---|
| 2003/0023421 A1* | 1/2003 | Finn | G06F 16/68 704/1 |
| 2014/0018947 A1* | 1/2014 | Ales | G11B 20/10 700/94 |
| 2014/0180674 A1* | 6/2014 | Neuhauser | G10H 1/0008 704/9 |
| 2015/0094835 A1* | 4/2015 | Eronen | G06F 3/165 700/94 |
| 2016/0239876 A1* | 8/2016 | Ales | G06K 9/0053 |
| 2019/0341010 A1* | 11/2019 | Wipperfurth | G06F 3/165 |
| 2020/0265083 A1* | 8/2020 | Miles | G06F 16/683 |
| 2021/0090535 A1* | 3/2021 | Miles | G06F 16/65 |

* cited by examiner

*Primary Examiner* — Marlon T Fletcher
(74) *Attorney, Agent, or Firm* — Volpe Koenig

(57) ABSTRACT

A system and method for estimating the popularity of song by calculating the (absolute and/or contrastive) harmonic surprise of each song in a corpus of music data, determining the popularity of each song in the corpus (e.g., based on a music chart, downloads, online streams), determining correlations between harmonic surprise and popularity, and estimating the popularity of an individual song based on the (absolute and/or contrastive) harmonic surprise of the individual song and the correlations between harmonic surprise and popularity.

1 Claim, 3 Drawing Sheets

PREDICTING THE POPULARITY OF A SONG BASED ON HARMONIC SURPRISE

CROSS-REFERENCE TO RELATED APPLICATIONS

This application claims priority to U.S. Prov. Pat. Appl. No. 62/806,570, filed Feb. 15, 2019, which is hereby incorporated by reference in its entirety.

FEDERAL FUNDING

None

BACKGROUND

For as long as musicians and recording companies have been producing and selling music, humans have been attempting to predict the popularity of songs. The ability to predict the song preferences of wide audiences enables musicians and music sellers to determine if a song should be rewritten, rerecorded, acquired, released, or promoted. With extensive music training and experience, a musician (or agent of a recording company) can listen to a song and make a subjective determination as to the suitability of each work. With countless songs being written and recorded, however, such a manual review is so inefficient that a comprehensive review of all available options is unrealistic. Furthermore, such subjective interpretations are prone to error, as even a gifted and experienced listener can incorrectly assess whether a piece of music will be suitable to the tastes of the general populace, which may shift over time.

Music cognition researchers have long proposed a relationship between expectation violation and perceived pleasure leading to music preference (Huron, 1996; Huron, 2006; Salimpoor, et al., 2015). Electrophysiology and neuroimaging experiments have identified neural correlates for the processing of harmonic expectation in music (e.g., Patel, et al., 1998; Koelsch, et al., 2001, Maess, et al., 2003; Tillmann et al., 2003), as well as neural correlates for the perception of pleasure associated with music preference (Salimpoor, et al., 2013). To date, however, conflicting hypotheses have been proposed about the role of expectation violation in music preference. Studies have shown that listening to familiar musical pieces with statistically unexpected events can lead to intense emotional responses (Sloboda, 1991; Salimpoor, et al., 2011), which might lead to preference. This evidence led to the formulation of the "absolute-surprise hypothesis," which states that perception of moderate increases in harmonic surprise (an information-theory measure of expectation violation), in themselves, leads to the reward signals responsible for music preference. Other evidence from studies using unfamiliar musical pieces have suggested that harmonically unexpected events themselves are perceived negatively (e.g., Patel, et al., 1998; Koelsch, et al., 2001, Maess, et al., 2003; Tillmann et al., 2003). It has been proposed that it is the relief from such events that leads to perceived pleasure (Huron, 2006). This evidence led to the formulation of the "contrastive-surprise hypothesis," which states that musical passages including a combination of events featuring moderate increases in harmonic surprise and subsequent, more harmonically expected events, together lead to music preference.

In "The relationship between the perception of unexpected harmonic events and preference in music," which formed the basis of U.S. Prov. Pat. Appl. No. 62/806,570 (from which the instant utility application claims priority), the Applicant performed a statistical analysis of the relationship between harmonic surprise and preference, identified changes that have occurred over time to the relationship between harmonic surprise and preference, and conducted a behavioral experiment to test the relationship between harmonic surprise and preference that they identified.

While performing that statistical analysis, the Applicant developed an automated process to evaluate the harmonic surprise of a piece of music, compare those harmonic surprise metrics to the harmonic surprise metrics of a corpus of songs of known popularity, and predict the popularity of that piece of music based on the identified relationship between harmonic surprise and preference. Disclosed is a system and method that performs that automated process to predict the popularity of a piece of music based on harmonic surprise. The system uses specific rules to automate the process of evaluating the potent popularity of a song. The disclosed process is distinct from the process previously performed by humans, who would simply listen to a song and subjectively assess its potential popularity.

SUMMARY

In order to overcome those and other disadvantages of the subjective prior art process, a system and method for estimating the popularity of songs is disclosed. The harmonic surprise (e.g., the absolute surprise and/or contrastive surprise) of each song in a corpus of music data is calculated. The popularity of each song is also determined (e.g., based on a music chart, downloads, online streams). Correlations between harmonic surprise and popularity are determined. And the popularity of an individual song is estimated based on the (absolute and/or contrastive) harmonic surprise of the individual song and the correlations between harmonic surprise and popularity.

The absolute surprise of a song may be calculated by determining the surprise of finding each distinct chord and averaging the surprise of finding each distinct chord. The contrastive surprise of a song may be calculated by identifying two or more sections of the song (e.g., a pre-chorus verse and the subsequent chorus) and determining the difference between the average surprise within each section. Alternatively, the contrastive surprise of a song may be calculated by determining the surprise of finding each distinct chord and identifying a pattern of surprise exhibited by the song over time.

The popularity of songs may be estimated, for example, by determining a minimum (absolute and/or contrastive) harmonic surprise threshold(s) indicative of popular songs and comparing the (absolute and/or contrastive) harmonic surprise of the song to the minimum harmonic surprise threshold(s). Furthermore, maximum harmonic surprise threshold(s) indicative of popular songs may be determined and the (absolute and/or contrastive) harmonic surprise of the song may be compared to the maximum harmonic surprise threshold(s)

In order to calculate the harmonic surprise of a song, the system may transcribe the music file of the song.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Figure 1:
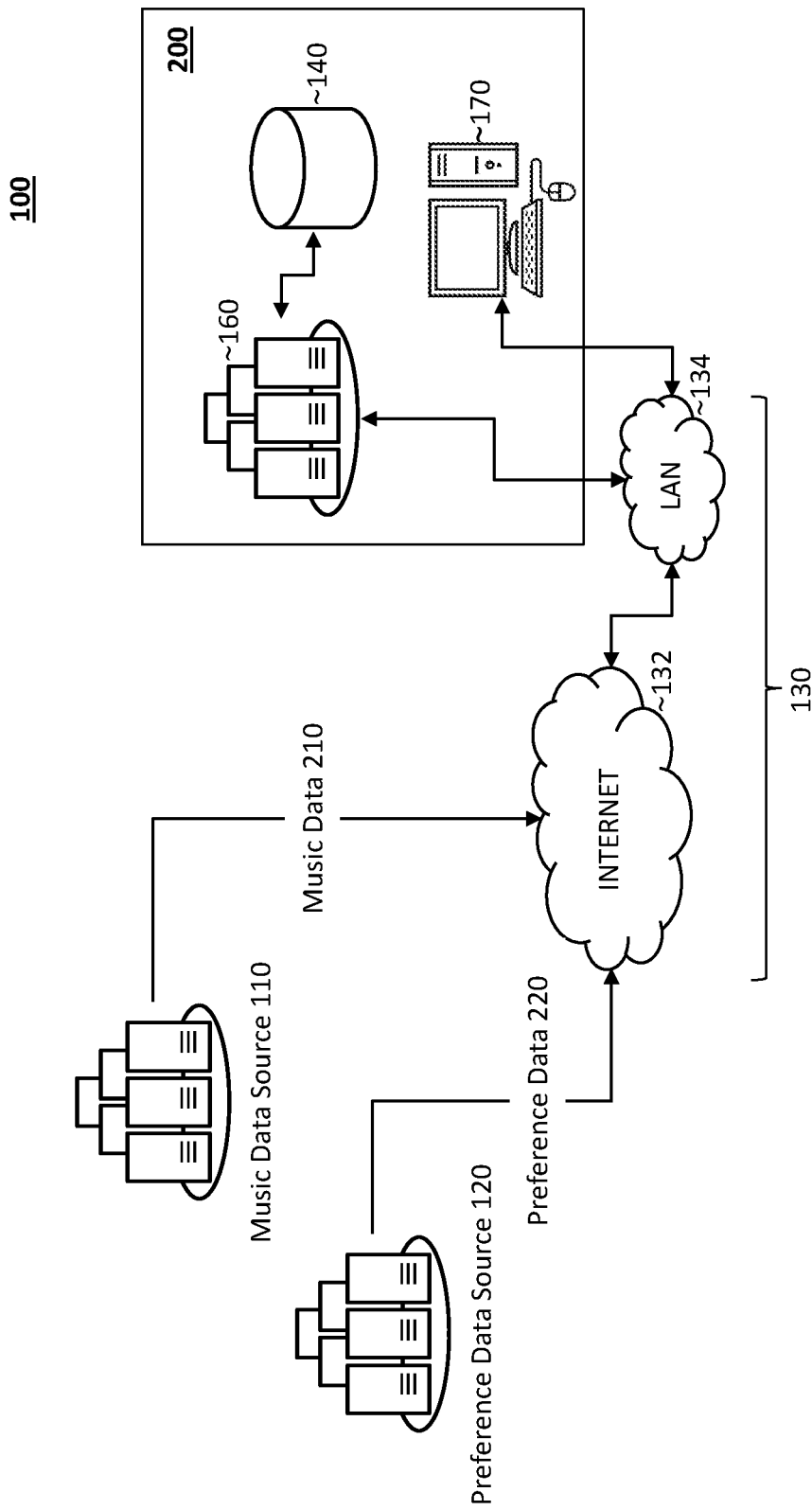
FIG. 1 is an overview of an architecture 100 of a music evaluation system 200 according to an exemplary embodiment.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is an overview of an architecture 100 of a music evaluation system 200 according to an exemplary embodiment.

As shown in FIG. 1, the architecture 100 includes one or more computing devices (e.g., a server 160 and/or computer 170) and a non-transitory storage medium 140 that are electrically connected to one or more music data sources 110 and one or more preference data sources 120 via one or more networks 130.

The music data source(s) 110 may be any source of music data 210, which includes songs or transcriptions of songs. As described in detail below, the music data source(s) 110 may be the McGill Billboard Project (Burgoyne, et al., 2011), which has made available a corpus of music data 210 that currently includes transcriptions of 732 Western popular music songs chosen at random from the Billboard Hot 100 charts over a 34-year period extending from 1958 to 1991. The music data source(s) 110 may also include a software-based online digital media store, such as iTunes, from which music data 210 may be downloaded. (ITUNES is a registered trademark of Apple Inc.) The music data source(s) 110 may include an online streaming service, such as Spotify, from which music data 210 may be streamed. (SPOTIFY is a registered trademark of Spotify AB limited company (ltd.).)

The preference data source(s) 120 may be any source of information indicative of the popularity of songs (referred to herein as preference data 220). The preference data 220 may include information from a chart indicative of the popularity of songs, such as "the Billboard Hot 100," which uses music sales, radio airplay, juke box song selection (until 1957), and digital streaming data (beginning in 2007) to estimate the most popular songs in a given period. As described in detail below, the preference data source(s) 120 may include the McGill Billboard Project, whose corpus of music data 210 includes peak rating on the Billboard Hot 100 chart for each song in the corpus. The preference data source(s) 120 may also include an online digital media store (e.g., iTunes), an online streaming service (e.g., Spotify), etc. The preference data 220 may indicate the relative popularity of songs within a specific genre (e.g., R&B/Hip Hop) or the relative popularity of songs within a specific geographic region (e.g., a chart for the U.S., the U.K., etc., downloads by users in a specific geographic region, online streams by users in a specific geographic regions, etc.)

The music data 210 and the preference data 220 may be downloaded via the one or more networks 130 (e.g., via a web server). As one of ordinary skill in the art may recognize, a single source may act as both the music data source 110 and the preference data source 120.

The networks 130 may include a wide area network 132, such as the Internet, a local area network 134, etc. The network(s) 130 may include one or more short- or long-range data connections that enable the computing device(s) (i.e., server 160 and/or computer 170) to receive information output by the music data source 110 and the preference data source 120. The network(s) 130 may include wired and/or wireless data connections.

The storage medium 140 may include any hardware storage medium, such as a hard disk, solid-state memory, etc.

The computing device(s) (i.e., server 160 and/or computer 170) may include any suitable computing device that executes instructions to perform the functions described herein. The computing device(s) execute instructions to receive data from the music data source 110 and the preference data source 120. Each of the computing device(s) include internal non-transitory storage media and at least one hardware computer processor. The storage medium 140 and the server 160 and/or computer 170 may be co-located or remotely located from each other. The computing device(s), in particular the computer 170, may include input devices (e.g., a keyboard, mouse, etc.) and output devices (e.g., a display). The computing device(s), in particular the computer 170, may provide a graphical user interface 290 to receive instructions from a user and display information to that user.

Figure 2:
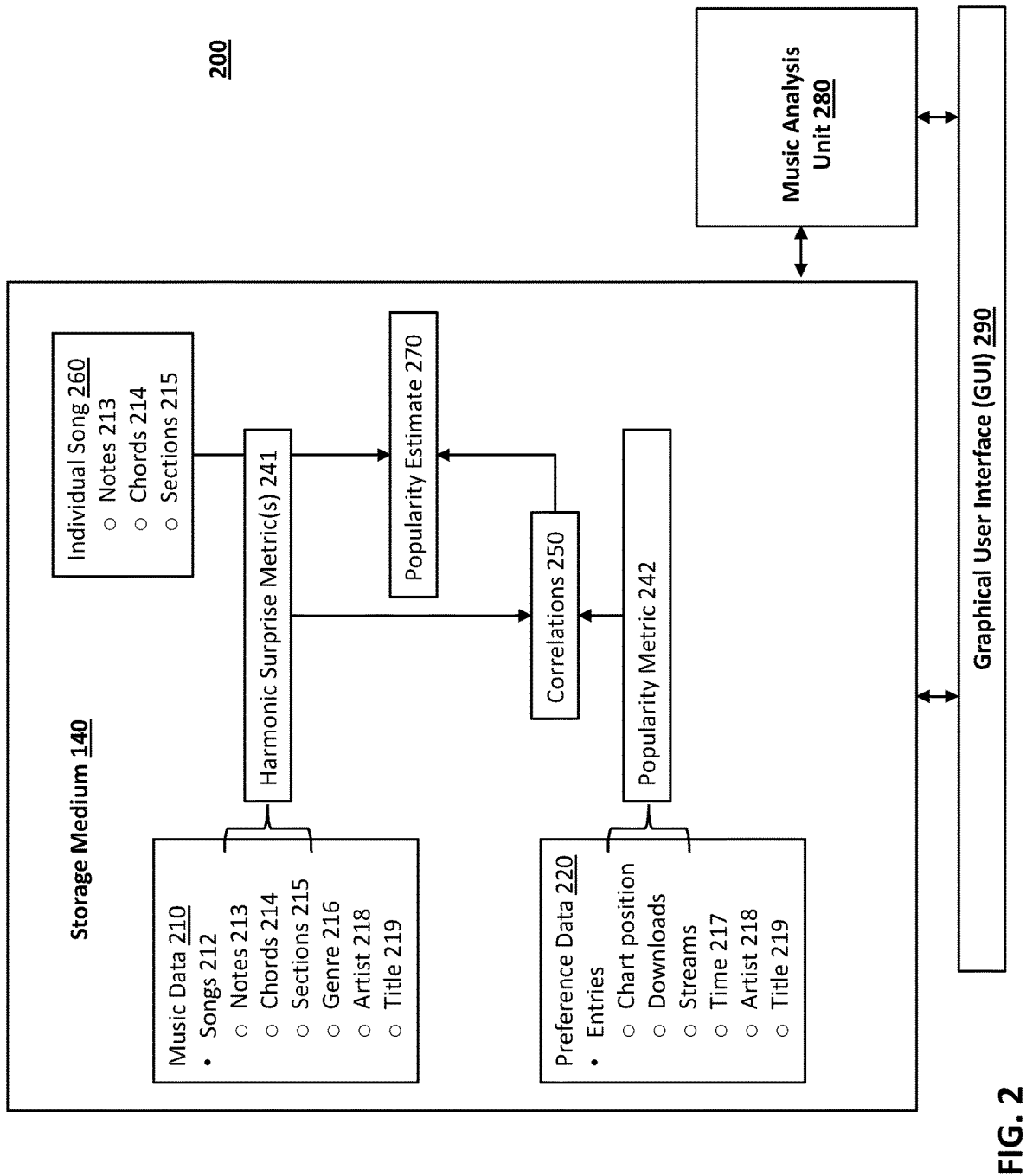
FIG. 2 is a block diagram of the music evaluation system 200 according to an exemplary embodiment.

FIG. 2 is a block diagram of the music evaluation system 200 according to an exemplary embodiment.

As shown in FIG. 2, the music evaluation system 200 includes music data 210 and preference data 220 (stored on the non-transitory storage medium 140), a music analysis unit 280, and a graphical user interface 290.

The corpus of music data 210 includes songs 212 of known popularity (as described below). Each song 212 includes a series of notes 213 that together form chords 214. Songs 212 may have a structure whereby the song 212 may be separated into sections 215 (e.g., verse, chorus, verse, chorus, bridge, chorus). Songs 212 added to the corpus of music data 210 may be transcribed for analysis. Each song 212 includes a title 218 and artist 219. Each song 212 may be classified as belonging to a music genre 216 (Rock, R&B/Hip-Hop, etc.) or more than one music genre 216. The genre 216 of each song 212 may be determined by the music data source 110. Alternatively, the genre 216 may be determined using a separate source, such as the All Music Guide.

The preference data 220 includes entries each corresponding to a song. One or more of those songs may be songs 212 from the corpus of music data 210. Each entry may include an artist 218 and title 219. Each entry may also include information indicative of the popularity of the song associated with the entry, such as a chart position (e.g., peak chart position, average chart position, number of weeks on the chart, etc.), a number of downloads, a number of online streams. The entry may also include a time period 217 during which the song achieved that level of popularity (e.g., the date of the song's chart debut, the date of the song's release, etc.).

The music analysis unit 280 may be embodied by software instructions stored on non-transitory media (e.g., the internal storage media of the server 160 and/or the computer 170) and executed by a hardware processor (e.g., the hardware processor of the server 160 and/or the computer 170).

The graphical user interface 290 may be any hardware interface capable of receiving instructions from a user (e.g., via the input devices of the computer 170) and display information to that user (via a display of the computer 170).

By analyzing the chords 214 included in each song 212 (in some instances, relative to the transitions between sections 215), the music analysis unit 280 generates one or more harmonic surprise metrics 241 for each song 212 in the corpus of music data 210. The music analysis unit 280 also identifies a popularity metric 242 based on the information indicative of the popularity of the song 212 included in that entry in the preference data 220. The music analysis unit 280 then compares the harmonic surprise metrics 241 of the songs 212 to the popularity metrics 242 of those songs 212 and determines correlations 250 between harmonic surprise and popularity. Then, when an individual song 260 (e.g., of unknown popularity) is identified, the music analysis unit 280 can use the same process to generate harmonic surprise metric(s) 241 of the individual song 260 and generate a popularity estimate 270 of the individual song 260 based on the harmonic surprise metric(s) 241 of the individual song 260 and the correlations 250 between harmonic surprise and popularity. The popularity estimate 270 may then be output to a user via the graphical user interface 290.

Figure 3:
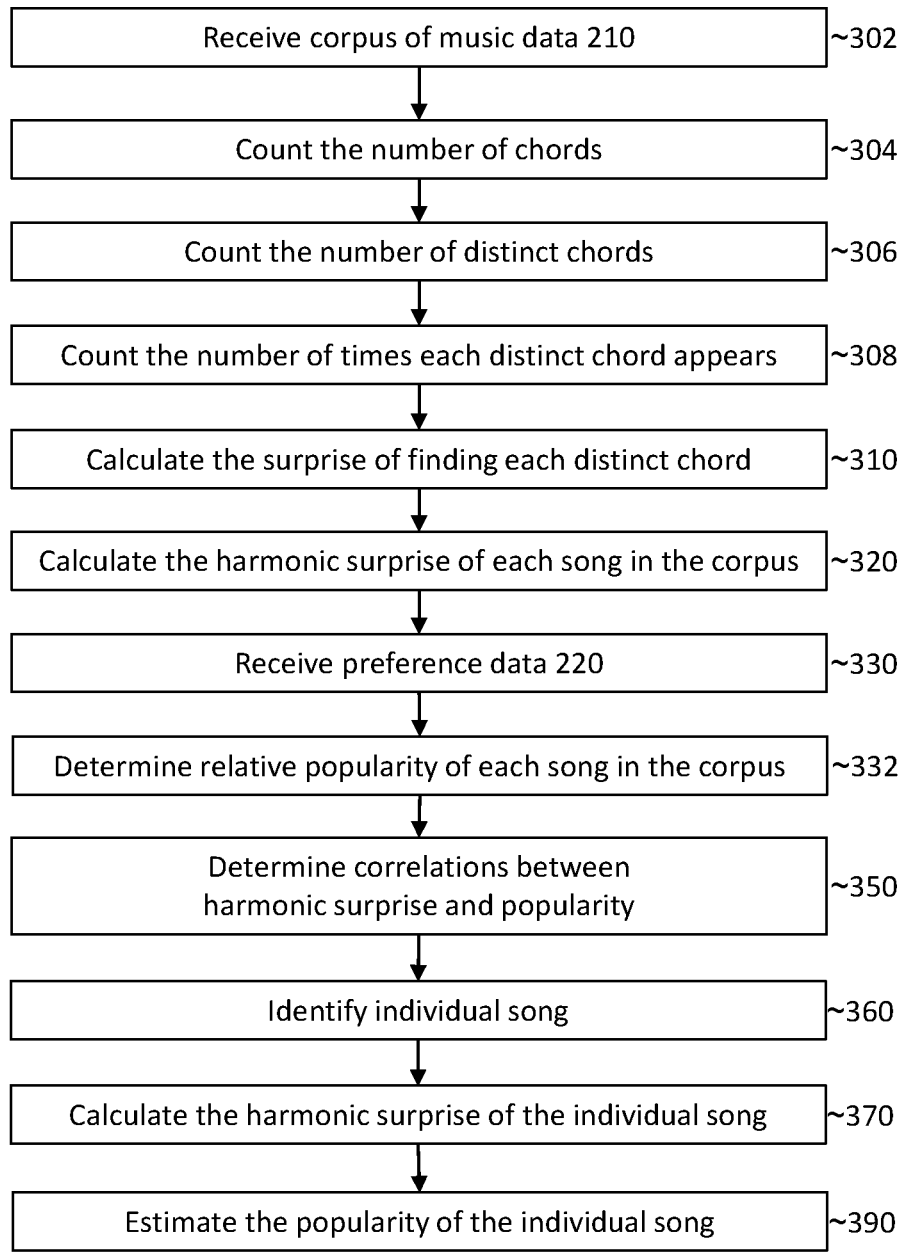
FIG. 3 is a flow chart of a harmonic surprise evaluation process 300 according to an exemplary embodiment.

FIG. 3 is a flow chart of a harmonic surprise evaluation process 300 according to an exemplary embodiment. The harmonic surprise evaluation process 300 may be performed by the one or more computing devices (i.e., the server 160 and/or the computer 170). As one of ordinary skill in the art will recognize, the processing steps of the harmonic surprise evaluation process 300 do not have to be performed in the order shown in FIG. 3 and described below.

A corpus of music data 210 is received from one or more music data sources 110 in step 302. As described above, the corpus of music data 210 may be the corpus made available as part of the McGill Billboard Project, which currently features transcriptions of 732 Western popular music songs chosen at random from the Billboard Hot 100 charts over a 34-year period extending from 1958 to 1991. Additional music data 210 may be added, for example, by downloading songs from an online digital media store (e.g., iTunes) or streaming them via an online streaming service (e.g., Spotify).

The total number of chords 214 that appear in the corpus of music data 210 is identified in step 304. The number of distinct chords 214 that appear in the corpus of music data 210 is identified in step 306. The number of times that each distinct chord 214 appear in the corpus of music data 210 are identified in step 308. Mathematically, these processing steps are represented as follows. Let N be the number of different chords appearing in the corpus of music data 210. Let $M_j$ be the number of times that each chord $C_j$ ($1 \leq j \leq N$) appears in the corpus of music data 210. Thus, the total number of chords 214 in the corpus of music data 210, including repetitions, is $\Sigma_{i=1}^{N} M_i$.

The surprise of finding each chord $C_j$ are calculated in step 310. The probability that a chord picked at random from the corpus is $C_j$ is $$P(C_j) = \frac{M_j}{\sum_{i=1}^{N} M_i}$$

and the surprise of finding $C_j$ is $$S(C_j) = -\log_2(P(C_j)). \qquad \text{[Equation 1]}$$

The harmonic surprise of each song 212 in the corpus of music data are calculated in step 320. Because there are several different forms of harmonic surprise and each form can have a different effect on human preference, several different forms of harmonic surprise may be calculated. Each form of harmonic surprise uses Equation 1 as the basis for the calculation.

One form of harmonic surprise may be the "absolute surprise", i.e. the average surprise $\overline{S}$ for all chords $C_j$ in an entire song σ:

$$\overline{S}(\kappa) = \sum_{j=1}^{N} P(C_j \mid \sigma, \kappa) S(C_j) \qquad \text{[Equation 2]}$$

where κ is a condition imposed on the chords contributing to the calculation. In this case the condition κ is "the entire song."

Another form of harmonic surprise that may be calculated is the "contrastive surprise," which is an indication of the variability of surprise across sections. This may be calculated in a few different ways. As an initial step, each section 215 of each song 212 is identified. For example, a pattern recognition algorithm may be trained to identify a chorus and differentiate between verses and a bridge. One measure of contrastive surprise is to measure the average surprise $\overline{S}$ in each section 215 of a song σ using the Equation 2 (where the condition κ is the entire section 215). The difference between the average surprise $\overline{S}$ from one section 215 to a subsequent section 215 is one measure indicative of contrastive surprise. Specifically, the change in average surprise $\overline{S}$ from a pre-chorus verse to the following chorus may be determined, as the Applicant's research has shown that a drop in average surprise $\overline{S}$ from a pre-chorus verse to the following chorus to be particularly correlated with human preference.

Alternatively, the contrastive surprise of a song may be calculated with more granularity to further identify specific patterns of contrastive that are correlated with human preference. For example, the surprise S of each beat in song σ may be determined (using Equation 1) to identify the pattern of surprise S over time, relative to the transitions between sections 215. As they describe in detail in "The relationship between the perception of unexpected harmonic events and preference in music," which formed the basis of the provisional application from which this application claims priority, the Applicant's research to date has shown a correlation between human preference and pattern whereby the song exhibits a gradual fall in surprise S at the end of a pre-chorus verse (that has a higher average surprise $\overline{S}$ than the following chorus).

In addition to the zeroth-order surprise calculated from the distribution of chords $C_j$ described above, the music analysis unit 280 may analyze the first-order and second-order transitions in the corpus of music data 210 (for example, using an n-gram based approach to determine the repeating patterns in a musical composition).

The preference data 220 is received from one or more preference data sources 120 in step 330. As described above, the preference data 220 may include information from a chart indicative of the popularity of songs (e.g., "the Billboard Hot 100"), download data aggregated from an online digital media store (e.g., iTunes), streaming data from an online streaming service (e.g., Spotify), etc. The preference data 220 includes information indicative of the popularity of songs 212 and, critically, the time period 217 during which each song 212 reached that level of popularity.

A measure of the relative popularity of each of the songs 212 in the corpus of music data 220 (referred to as the popularity metric 242 for that song 212) is determined in step 332. The popularity metric 242 may be any combination of chart position (e.g., peak chart position, average chart position, number of weeks on the chart, etc.), number of downloads, number of streams, etc. Ideally, the popularity metric 242 would be determined for each song 212 in the corpus of music data 220 using the exact same measure of relative popularity. However, that may not be possible. The chart position of a song 212 is only available for songs 212 that were popular enough to reach the charts. Download and streaming data may be available for a wide range of relatively popular and relatively unpopular songs 212, but that data is only available for songs 212 in recent history. Accordingly, the music analysis unit 280 may be use different measures of relative popularity to determine the popularity metric 242 for songs 212 that achieved that level of popularity in different time periods 217. For example, chart position may be used to generate the popularity metric 242 for songs 212 that achieved that level of popularity before a certain date (e.g., 2010) whereas another popularity metric 242 (e.g., a combination of the number of downloads, the number of streams, and/or chart position) may be used for songs 212 that achieved that level of popularity after that date.

Correlations 250 between the harmonic surprise metric(s) 241 of the songs 212 (calculated in step 320) and the popularity metrics 242 of the songs 212 (as indicated in the preference data 220) are determined in step 350. Those correlations 250 may be determined by an analysis of variance, a mixed model, a regression analysis, a machine learning model trained on the corpus of the music data 210 with known preference data 220, etc.

The music analysis unit 280 may determine that there exists a linear correlation 250 between harmonic surprise (e.g., absolute surprise, contrastive surprise, etc.) and the popularity of a song. However, the determined correlations 250 between the harmonic surprise metrics 241 and popularity metrics 242 may take any shape. For example. the Applicant's research with the McGill Billboard Project corpus also revealed evidence of a ceiling effect whereby moderate increases—and only moderate increases—in absolute and contrastive surprise were correlated with increases in the popularity of a song 212. Accordingly, the music analysis unit 280 may determine that there exists a bell-shaped correlation 250 between harmonic surprise metric(s) 241 and the popularity metrics 242 whereby songs 212 with harmonic surprise metric(s) 241 above a certain minimum and below a certain maximum are correlated with higher relative popularity. Meanwhile, looking at correlations 250 between surprise and popularity over time, the Applicant's research found evidence that harmonic surprise is increasing in an inflationary manner. Accordingly, the music analysis unit 280 may determine that the levels of harmonic surprise that are indicative of popular songs are increasing over time. As more music data 210 and preference data 220 is added, the music analysis unit 280 may determine if the inflationary trend observed by the Applicant has continued or if the levels of harmonic surprise that are indicative of popular songs ever level off. Finally, as the Applicant acknowledged in its research, the McGill Billboard Project corpus is limited to songs that were popular enough to chart in the Billboard Hot 100. If the corpus of music data 210 used by the music analysis unit 280 expands to include songs with measurable preference data 220 (e.g., digital downloads or streams) that are nevertheless not popular enough to reach even the lowest quartile of the Billboard Hot 100 chart, the music analysis unit 280 may determine, for example, that correlations 250 between harmonic surprise and the popularity of a song exhibit an "inverted-U" shape where songs with higher (absolute and/or contrastive) surprise are found along both ends of the popularity spectrum.

Because the correlations 260 between harmonic surprise metric(s) 241 and popularity metrics 242 may vary for songs in different genres 216, the music analysis unit 280 may determine separate correlations 260 for songs 212 classified as being part of each genre 216. Additionally, as the Applicant acknowledges in its research, the correlations 260 between harmonic surprise metric(s) 241 and popularity metrics 242 may differ from culture-to-culture and from region-to-region. Therefore, the music analysis unit 280 may use preference data 220 for a specific geographic region to determine correlations 260 between harmonic surprise metric(s) 241 and popularity metrics 242 in that specific geographic region.

An individual song 260 is identified in step 360. Since the music evaluation system 200 will be used to predict the popularity of the individual song 260 identified in step 360, it will usually be a song of unknown popularity. However, nothing prevents the music evaluation system 200 from being used to predict the popularity of an existing song of known popularity (e.g., to test the accuracy of the prediction). The music evaluation system 200 may receive the individual song 260 via the one or more networks 230 (e.g., by downloading the individual song 260 from an online digital media store via the internet, transferring the song via a local network 232, etc.), transferring the song to the server 160 or the computer 170 via a physical storage medium, etc.

The harmonic surprise metric(s) 241 of the individual song 260 is calculated in step 370 using the same process as was used to calculate the harmonic surprise of each song in the corpus of music data 210 in step 320. For example, the individual song 260 may be transcribed (e.g., by converting the digital audio file to the MIDI format), the sections 215 of the individual song 260 (e.g., verse, chorus, verse, chorus, bridge, chorus) may be identified, and harmonic surprise metric(s) 241 (indicative of the absolute surprise and/or contrastive surprise) of the individual song 260 may be calculated.

The popularity of the individual song 260 (referred to as the popularity estimate 270) is estimated in step 390 based on the harmonic surprise of the individual song 260 (calculated in step 370) and the correlations 250 between the harmonic surprise metric(s) 241 of songs in the corpus of music data 210 and the popularity metrics 242 of the songs in the corpus of music data 210 (determined in step 350). The popularity estimate 270 is output to the user (e.g., via the graphical user interface of the computer 170) in step 392.

In one embodiment, a minimum harmonic surprise threshold (that is correlated with popular songs or, more specifically, with recent popular songs) may be determined in step 350 as described above and the harmonic surprise metrics(s) 241 of the individual song 260 (calculated in step 370) may be compared to the minimum harmonic surprise threshold in step 390. As described above, separate minimum harmonic surprise thresholds may be calculated for absolute harmonic surprise and contrastive harmonic surprise. If a ceiling effect is determined, one or more maximum harmonic surprise thresholds may also be determined in step 350 and the harmonic surprise metric(s) 241 of the individual song 260 (calculated in step 370) may also be compared to the maximum harmonic surprise thresholds in step 390. In another embodiment, a pattern of contrastive surprise over time may be found in popular songs (or recent popular songs) in step 350 and the pattern of contrastive surprise over the course of the individual song 260 (calculated in step 370) may be compared to the pattern (determined in step 350) in step 390.

If the music analysis unit 280 determines genre-specific correlations 260 as described above, then the music analysis unit 280 may determine the popularity estimate 270 using the genre-specific correlations 260 for the genre 216 of the individual song 260. If the music analysis unit 280 determines geographic region-specific correlations 260 as described above, the music analysis unit 280 may determine a popularity estimate 270 for the geographic region of the geographic region-specific correlations 260 using those geographic region-specific correlations 260.

In addition to the harmonic surprise, there are other possible influences on preference that do not involve harmony (for example, aspects having to do with the timing of the chords, etc.). It is contemplated that, in future iterations, the music evaluation system 200 may be expanded to determine correlations between popularity and additional musically-relevant characteristics. However, as demonstrated by the Applicant, the estimation of the popularity of individual songs 260 may be based at least in part on the harmonic surprise of the individual song 260 and the correlations 250 between the harmonic surprise of songs 212 in the corpus of music data 210 and the popularity of the songs 212 in the corpus of music data 210.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

EXAMPLES

As described above, the disclosed system and method may receive a corpus of music data (including songs comprising notes arranged in chords), calculate one or more harmonic surprise metrics (indicative of the harmonic surprise of each song) for each of the songs included in the corpus of music data, receive preference data including information indicative of the popularity of the songs included in the corpus of music data, identifying a popularity metric (indicative of the popularity of each song) for each of the songs in the corpus of music data, determine correlations between the harmonic surprise metrics and the popularity metrics for the songs in the corpus of music data, identify an individual song, calculate the one or more harmonic surprise metrics for the individual song, and estimate the popularity of the individual song based at least in part on the one or more harmonic surprise metrics for the individual song and the correlations between the harmonic surprise metrics and the popularity metrics for the songs in the corpus of music data.

The one or more harmonic surprise metrics for each song may be indicative of the absolute surprise of each song and the contrastive surprise of each song. The harmonic surprise metric indicative of the absolute surprise may be calculated for each song by determining the surprise of finding each distinct chord and averaging the surprise of finding each distinct chord. The harmonic surprise metric indicative of the contrastive surprise may be calculated for each song by determining the surprise of finding each distinct chord, identifying two or more sections of the song (e.g., a pre-chorus verse and chorus that follows the pre-chorus verse), averaging the surprise of finding each distinct chord within each section, and determining a difference between the average surprise within each section. The harmonic surprise metric indicative of the contrastive surprise may be calculated for each song by determining the surprise of finding each distinct chord and identifying a pattern of surprise exhibited by the song over time.

Determining correlations between the harmonic surprise metrics and the popularity metrics may comprise determining one or more minimum harmonic surprise thresholds indicative of popular songs. Estimating the popularity of the individual song may comprise comparing the one or more harmonic surprise metrics for the individual song to the one or more minimum harmonic surprise thresholds. Determining correlations between the harmonic surprise metrics and the popularity metrics may further comprise determining one or more maximum harmonic surprise thresholds indicative of popular songs. Estimating the popularity of the individual song may further comprise comparing the one or more harmonic surprise metrics for the individual song to the one or more maximum harmonic surprise thresholds.

The corpus of music data may include music files. As such, calculating one or more harmonic surprise metrics for each of the songs included in the corpus of music data may comprise transcribing the music files.

REFERENCES

Burgoyne, J. A., Wild, J., & Fujinaga, I. (2011, October). An expert ground truth set for audio chord recognition and music analysis. In *ISMIR* (Vol. 11, pp. 633-638).

Huron, D. (1996). The melodic arch in Western folksongs. Computing in Musicology, 10, 3-23.

Huron, D. B. (2006). Sweet anticipation: Music and the psychology of expectation. MIT press.

Koelsch, S., Gunter, T. C., Schroger, E., Tervaniemi, M., Sammler, D., & Friederici, A. D. (2001). Differentiating ERAN and MMN: an ERP study. NeuroReport-Oxford, 12(7), 1385-1389.

Maess, B., Koelsch, S., Gunter, T. C., & Friederici, A. D. (2001). Musical syntax is processed in Broca's area: an MEG study. Nature Neuroscience, 4(5), 540-545.

Patel, A. D., E. Gibson, J. Ratner, et al. (1998). Processing syntactic relations in language and music: an event-related potential study. Journal of Cognitive Neuroscience, 10: 717-733.

Salimpoor, V. N., Benovoy, M., Larcher, K., Dagher, A., & Zatorre, R. J. (2011). Anatomically distinct dopamine release during anticipation and experience of peak emotion to music. Nature Neuroscience, 14(2), 257-262.

Salimpoor, V. N., van den Bosch, I., Kovacevic, N., McIntosh, A. R., Dagher, A., & Zatorre, R. J. (2013). Interactions between the nucleus accumbens and auditory cortices predict music reward value. Science, 340(6129), 216-219.

Salimpoor, V. N., Zald, D. H., Zatorre, R. J., Dagher, A., & McIntosh, A. R. (2015). Predictions and the brain: how musical sounds become rewarding. Trends in Cognitive Sciences, 19(2), 86-91.

Sloboda, J. A. (1991). Music structure and emotional response: Some empirical findings. Psychology of music, 19(2), 110-120.

Tillmann, B., Janata, P., & Bharucha, J. J. (2003). Activation of the inferior frontal cortex in musical priming. Cognitive Brain Research, 16(2), 145-161.

What is claimed is:

1. A method, comprising:

receiving a corpus of music data, the corpus of music data including songs comprising notes arranged in chords;

calculating one or more harmonic surprise metrics for each of the songs included in the corpus of music data, the one or more harmonic surprise metrics for each song being indicative of the harmonic surprise of each song;

receiving preference data including information indicative of the popularity of the songs included in the corpus of music data;

identifying a popularity metric for each of the songs in the corpus of music data, the popularity metric for each song being indicative of the popularity of each song;

determining correlations between the harmonic surprise metrics and the popularity metrics for the songs in the corpus of music data;

identifying an individual song;

calculating the one or more harmonic surprise metrics for the individual song; and estimating the popularity of the individual song based at least in part on the one or more harmonic surprise metrics for the individual song and the correlations between the harmonic surprise metrics and the popularity metrics for the songs in the corpus of music data.

* * * * *